United States Patent
Tajan et al.

(10) Patent No.: US 9,677,408 B2
(45) Date of Patent: Jun. 13, 2017

(54) SYSTEM FOR CONTROLLING THE PITCH OF THE PROPELLER BLADES OF A TURBOMACHINE, AND A TURBOMACHINE WITH A PROPELLER FOR AN AIRCRAFT WITH SUCH A SYSTEM

(71) Applicant: SNECMA, Paris (FR)

(72) Inventors: Sébastien Tajan, Sucy en Brie (FR); Christophe Jacquemard, Héricy (FR); Adrien Fabre, Montrouge (FR)

(73) Assignee: SNECMA, Paris (FR)

( * ) Notice: Subject to any disclaimer, the term of this patent is extended or adjusted under 35 U.S.C. 154(b) by 678 days.

(21) Appl. No.: 14/264,366

(22) Filed: Apr. 29, 2014

(65) Prior Publication Data

US 2014/0322016 A1    Oct. 30, 2014

(30) Foreign Application Priority Data

Apr. 29, 2013  (FR) ...................... 13 53924

(51) Int. Cl.
| | | |
|---|---|---|
| *F01D 7/00* | (2006.01) | |
| *B64C 11/06* | (2006.01) | |
| *B64C 11/32* | (2006.01) | |
| *B64D 27/00* | (2006.01) | |

(52) U.S. Cl.
CPC ............... *F01D 7/00* (2013.01); *B64C 11/06* (2013.01); *B64C 11/32* (2013.01); *B64D 2027/005* (2013.01); *F05D 2260/76* (2013.01); *Y02T 50/66* (2013.01)

(58) Field of Classification Search
CPC ......... F01D 7/00; B64C 11/06; F05D 2260/76
USPC .......... 416/155, 157 A; 415/77, 83, 91, 126, 415/127, 206, 224
See application file for complete search history.

(56) References Cited

U.S. PATENT DOCUMENTS

| | | | | |
|---|---|---|---|---|
| 2,028,463 A | * | 1/1936 | McDougall | ............. B64C 11/36 |
| | | | | 416/152 |
| 3,043,374 A | * | 7/1962 | Letourneau | ............. B63H 3/06 |
| | | | | 416/155 |

(Continued)

FOREIGN PATENT DOCUMENTS

| | | |
|---|---|---|
| WO | WO 99/00884 | 1/1999 |
| WO | WO 2012/012482 A1 | 1/2012 |
| WO | WO 2013/029085 A1 | 3/2013 |

OTHER PUBLICATIONS

French Preliminary Search Report issued Jan. 9, 2014 in French Application 13 53659 (with English Translation of Categories of Cited Documents, and Written Opinion).

*Primary Examiner* — Kevin Murphy
(74) *Attorney, Agent, or Firm* — Oblon, McClelland, Maier & Neustadt, L.L.P.

(57) ABSTRACT

A control system includes a power actuator coaxial with the axis of rotation of the propeller, and a transmission device connecting the power actuator to pivots, of the blades to be controlled, arranged substantially radially with respect to the axis of rotation. The actuator is a rotary jack whose mobile part rotates about the axis of rotation and is connected to the transmission device by a mobile mechanical connection which transforms the rotation imparted by the mobile part of the jack about the axis of rotation into a rotation of the blades about the axes of the pivots which are perpendicular to the axis of rotation.

8 Claims, 3 Drawing Sheets

(56) References Cited

U.S. PATENT DOCUMENTS

| | | | | |
|---|---|---|---|---|
| 3,567,340 A * | 3/1971 | Schneider | ............... | B64C 11/30 |
| | | | | 416/162 |
| 3,663,119 A * | 5/1972 | Brooking | .................. | F01D 7/00 |
| | | | | 416/157 A |
| 3,664,763 A * | 5/1972 | Chilman | ................... | F01D 7/00 |
| | | | | 416/157 A |
| 4,124,330 A * | 11/1978 | Barnes | .................... | B64C 11/30 |
| | | | | 416/157 B |
| 5,977,645 A | 11/1999 | Glennon | | |
| 8,172,530 B2 * | 5/2012 | Perkinson | ............. | B64C 11/306 |
| | | | | 416/1 |
| 8,529,205 B2 * | 9/2013 | Perkinson | ............... | B64C 11/38 |
| | | | | 416/1 |
| 2008/0199318 A1 * | 8/2008 | Svensson | ............ | F04D 15/0055 |
| | | | | 416/149 |
| 2010/0109581 A1 | 5/2010 | Sheahan, Jr. et al. | | |
| 2012/0181856 A1 | 7/2012 | Sheahan, Jr. et al. | | |

\* cited by examiner

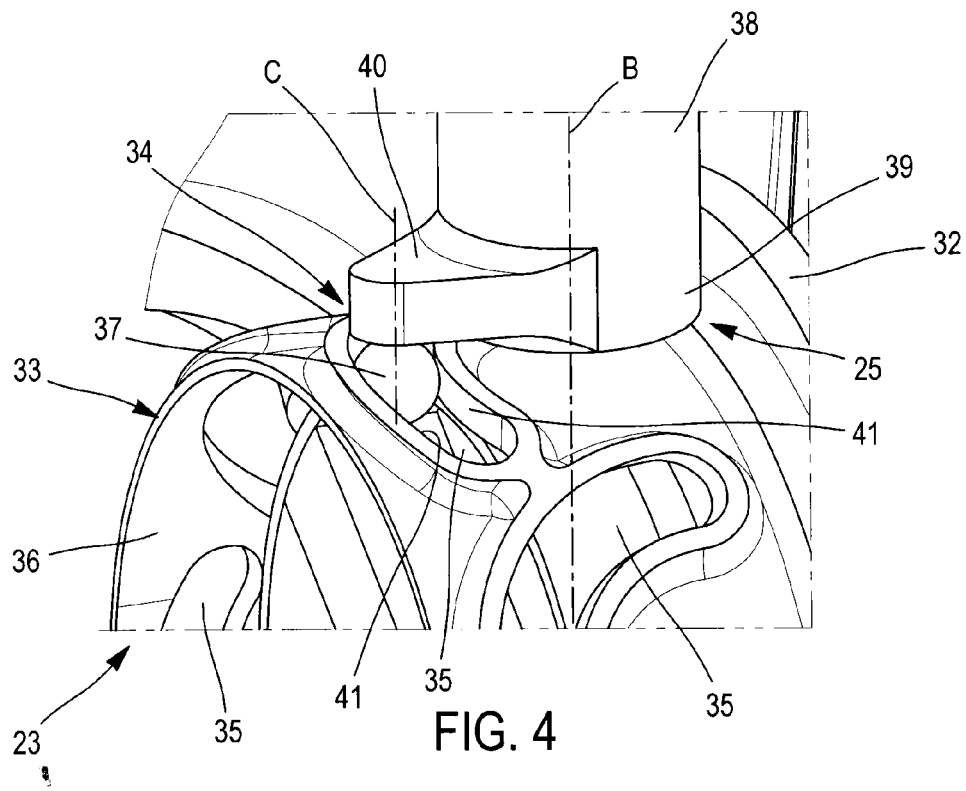
FIG. 4
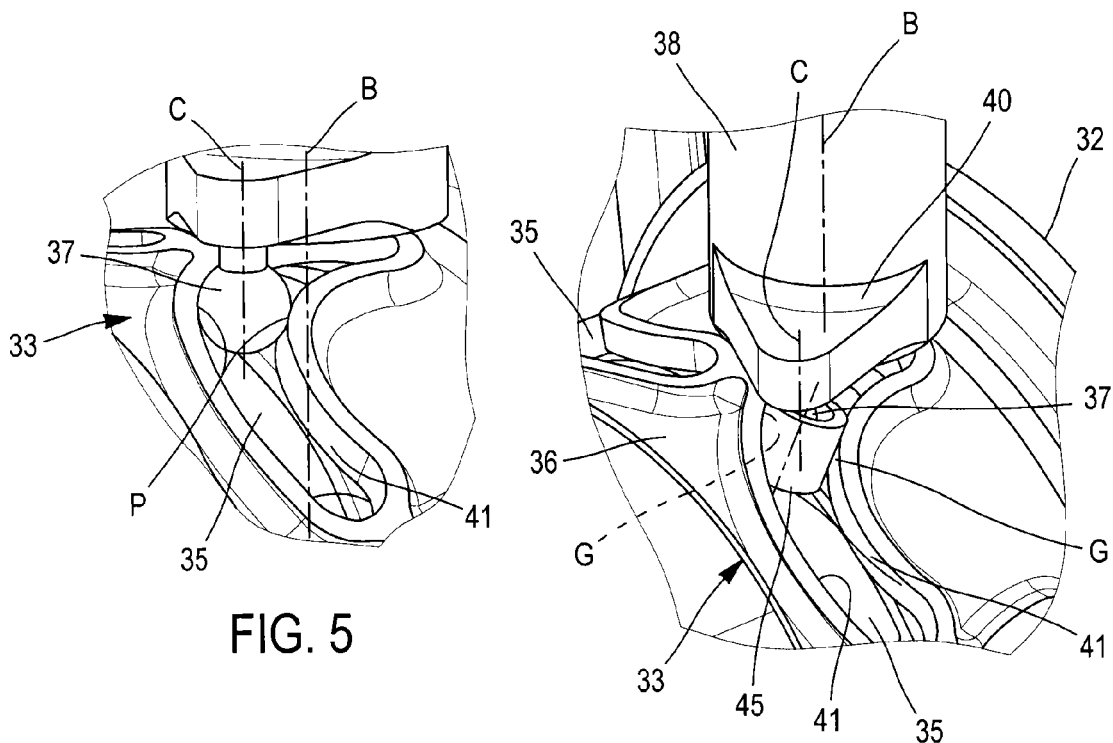
FIG. 5
FIG. 6

SYSTEM FOR CONTROLLING THE PITCH OF THE PROPELLER BLADES OF A TURBOMACHINE, AND A TURBOMACHINE WITH A PROPELLER FOR AN AIRCRAFT WITH SUCH A SYSTEM

BACKGROUND OF THE INVENTION

The present invention relates to a system for controlling the pitch of the blades of a propeller of a turbomachine, and to a turbomachine having propeller(s) for an aircraft fitted with such a system for controlling the pitch of the propeller.

More particularly, although not exclusively, the turbomachine can be either a turboprop having one or more propulsive propellers, or a turbo-engine equipped with contra-rotating propulsive propellers, and termed "open rotor" or "unducted fan", wherein the system for controlling the pitch of the blades of the invention can adapt regardless to the propeller or to each propeller of a turboprop or of an open rotor turbo-engine.

Each propeller conventionally comprises a rotating hub with an outer collar or ring having, in the sidewall thereof, cylindrical radial housings distributed regularly and in which the pivot shafts of the blades are received.

In order to allow optimum operation of the turbo-engine depending on the various flight phases encountered, the blades of the propeller can rotate via the intermediary of their pivot shafts or pivots in the radial housings of the hub, substantially radially (aligned parallel or not) with respect to the axis of rotation of the hub. To that end, they are simultaneously driven (an angular offset can exist from one blade to another) in rotation with respect to the housings of the hub, by means of an appropriate control system by means of which the setting of the blades of the propeller, that is to say their pitch, can be adjusted in flight.

This system for controlling the pitch of the blades covers, for example in the case of a turbo-engine having twin propellers, an angular range of rotation between two end positions, specifically a "reverse" end position in which the blades extend, for example by 30°, beyond the plane which is transverse (or longitudinal) with respect to the axis of the turbo-engine (the forward direction of the airplane) in order to help brake the aircraft, in the manner of conventional thrust reversers, and a "feathered" end position in which the blades are then effaced as much as possible with respect to the forward direction of the airplane, for example in the event of engine shutdown, and thus present the least resistance (drag) possible. The angular range of the blades between the feathered and reverse positions is for example of the order of approximately 120°.

DESCRIPTION OF THE PRIOR ART

Various solutions have been proposed for controlling the pitch of the blades of the propellers on turbomachines of the turboprop or "open rotor" turbo-engine type.

Generally, the control systems comprise a power actuator, such as a linear hydraulic jack, which is coaxial to the axis of rotation of the propeller and can be driven or not in rotation with the propeller. The actuator can also be of the ball screw type with linear motion. This controllable actuator is complemented by a transmission device whose purpose is to connect the mobile part of the linear jack to the pivots of the blades so as to transform the linear or translational motion of the jack, along the axis of the propeller and thus of the turbomachine, into an angular motion or rotation of the blades about their pivots, radially with respect to the axis of the propeller. This transmission device comprises in particular pairs of articulated rods and joints, pushed or pulled by the jack, each pair engaging with one blade. One of the articulated rods of each pair is connected to a transmission shaft which causes the propeller to rotate, in order to bring the associated blade into the position corresponding to the desired flight envelope.

Although this transmission device, having pairs of articulated rods and joints, of the pitch control system offers satisfactory results, it is evident that it requires a large number of moving parts with clearances which are difficult to control, and that it is furthermore bulky because of the magnitude of the motion of these same parts in order to convert the translation of the jack into a rotation of the pivots of the blades. The bulkiness is even greater since the number of articulated rod-joint pairs corresponds to the number of blades to be oriented, which in addition implies a corresponding mass which is always disadvantageous in this field. Moreover, rigorous and regular maintenance must be ensured as, in particular, clearances appear in use, as a consequence of wear, at the various joints between the articulated rods and other surrounding parts to which the transmission device is connected.

SUMMARY OF THE INVENTION

The invention aims to remedy these drawbacks and relates to a system for controlling the pitch of the blades of a propeller of a turbomachine, the proposed design of which is simplified with respect to the number of parts making up the system, while reducing the bulkiness and mass of the latter.

To that end, the system for controlling the pitch of the blades of a propeller of a turbomachine, comprising a propeller, a power actuator coaxial with the axis of rotation of the propeller, and a transmission device connecting the power actuator to pivots, of the blades to be controlled, arranged substantially radially with respect to said axis of rotation, said power actuator being a rotary jack comprising a body and a mobile part which rotates about said axis of rotation, is noteworthy according to the invention by the fact that the mobile part of the jack is secured in rotation with a substantially cylindrical collar which extends at least in part about said body of the jack and which comprises guide slots which engage with cams of the transmission device in order to transform the rotation imparted by the mobile part of the jack about said axis of rotation into a rotation of the blades about the axes of the pivots which are perpendicular to the axis of rotation.

Thus, by virtue of the arrangement of a rotary jack and an appropriate connection of the device to the mobile part of the jack, the control system is made more compact by the absence of translational motion along the longitudinal axis of the propeller and, therefore, in practice, the axis of the turbomachine, as supplied by the linear jacks conventionally employed, requiring space in order to work, and it furthermore comprises fewer parts.

The substantially cylindrical collar extends at least in part about said body of the jack in order to be guided and centered by the latter, which is particularly advantageous.

The system having guide slots and cams is simple and compact. It allows the rotation of the jack about the longitudinal axis to be converted into simultaneous rotations of the blades about their respective radial pivots, perpendicular to the longitudinal axis of rotation.

The propeller preferably comprises an annular hub housing the pivots of the blades, this hub extending at least in part about said collar. Advantageously, the space requirement, in line with the axis of rotation, of the rotary jack and of the transmission device having a mobile mechanical connection is at most equal to the length (in the direction of the axis of rotation) of the annular hub of the propeller housing the pivots of the blades. Of note is therefore the compactness of the system which, ultimately, fits into a small space, substantially inside the hub for supporting the pivots of the blades.

In one preferred embodiment, the guide slots of the collar are female guide slots and the cams of the transmission device are male cams received in the guide slots.

In particular, the female guide slots are arcuate, helical, or similar and are created in or attached to the collar, permanently (for example by welding) or removably (for example by bolting), and the male cams are borne by respective radial arms of the transmission device in connection with the pivots of the blades.

This therefore produces a quasi-direct transfer of the rotation of the jack to the rotations of the blades by means of the helical mechanical connection and the arms, which significantly reduces the number of parts of the system in comparison with the earlier systems having pairs of articulated rods and joints, which result in a large number of parts, a large space requirement, an increase in mass, and wear over the long term. Such a transmission device thus avoids the problems of the solutions using a linear jack.

Furthermore, the cams are eccentric parallel to the radial arms in order to rotate about the axes of the latter as a consequence of the rotation of the collar having guide slots, the connection between each cam and the associated guide slot being spherical or cylindrical.

Thus, the eccentric cams move in the manner of cranks and can follow the helical motion, along the axis of the propeller, imparted by the guide slots during the rotation of the collar driven by the jack. This ensures structural and functional reliability of the transmission device, complemented by a contact of the cams with the guide slots, with a coefficient of friction which is designed to be minimal.

Advantageously, the radial arms of the transmission device are arranged in line with the radial pivots of the blades, being connected coaxially with the latter. A simple direct radial connection is thus required between each cam and its pivot of a blade to be controlled.

Preferably, the collar having guide slots is secured to the output shaft of the rotating part of the jack by means of a radial coupling flange attached to the shaft on the inside and to the collar on the outside.

The rotary jack is preferably of the type having a radial vane and it may be controlled fluidically, for example hydraulically, or electrically.

The invention also relates to a turbomachine of the type comprising at least one propeller and a system for controlling the pitch of the blades.

Advantageously, the system for controlling the pitch of the blades of the propeller is as defined above.

BRIEF DESCRIPTION OF THE DRAWINGS

The figures of the appended drawing will make it easy to understand how the invention may be embodied.

FIG. 4 shows, in enlarged perspective, the mobile mechanical connection having guide slots and cams of the transmission device with the mobile part of the jack.

FIG. 5 shows, in schematic perspective, the spherical joint of the cam with the guide slot of the rotating collar.

FIG. 6, similar to FIG. 5, shows a cylindrical joint connecting the cam to the guide slot.

DESCRIPTION OF THE PREFERRED EMBODIMENTS

Figure 1:
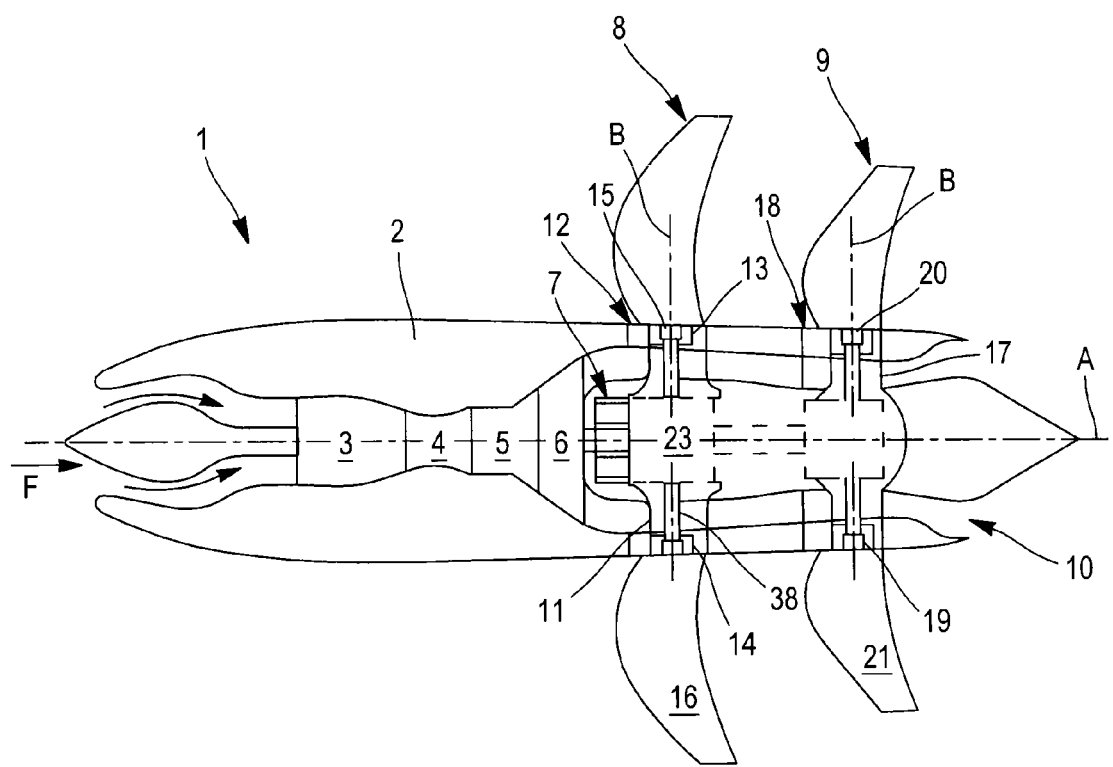
FIG. 1 is a schematic view in axial section of a turbo-engine having an unducted fan located downstream of the gas generator, incorporating a system for changing the pitch of the blades in accordance with the invention for one of the propellers of the fan.

Reference is first made to FIG. 1 which shows, schematically, a turbomachine for an aircraft, such as a turbo-engine having an unducted fan 1, also termed "open rotor". This turbo-engine 1 comprises conventionally, from upstream to downstream in the flow direction of the gaseous flow F inside a nacelle 2 of the turbo-engine, a portion having one or more compressors 3, an annular combustion chamber 4, a portion having turbines 5, of which the downstream one 6 drives, via the intermediary of a reduction gear or a planetary gearset 7 and in contra-rotating fashion, two propellers 8, 9 which are aligned coaxially along the longitudinal axis A of the turbo-engine and which form the fan.

The propellers, in particular the upstream propeller 8 and the downstream propeller 9, are arranged in parallel radial planes, perpendicular to the axis A, and rotate by virtue of the downstream turbine 6 and the reduction gear 7 in opposite directions of rotation.

As shown in FIG. 1, the upstream propeller 8 comprises a cylindrical rotating casing 11, connected in rotation to a corresponding part of the reduction gear so as to rotate in one direction. This rotating casing 11 is supported by bearings on a fixed cylindrical casing of the turbo-engine, the bearings and fixed casing not being shown. The casing 11 terminates, on the outside, in a rotating hub having a polygonal ring 12 housed conventionally in the nacelle 2 and receiving, in cylindrical housings 13 created radially in the sidewall 14 of the hub, the pivots or feet 15 of the blades 16 of the propeller 8. The blades thus project outward with respect to the nacelle.

Similarly, the downstream propeller 9 comprises a cylindrical rotating casing 17, connected on one side in rotation with another part of the reduction gear 7, so as to then rotate in the opposite direction. This rotating casing 17, supported by bearings, terminates in a rotating hub having a polygonal ring 18 receiving, as above, in cylindrical housings 19, the pivots or feet 20 of the blades 21 of the propeller 9.

In operation, and briefly, the flow of air F entering the turbo-engine 1 is compressed, then mixed with fuel and burned in the combustion chamber 4. The combustion gases produced then pass into the portion having turbines 5 and 6 so as to drive in rotation in the opposite direction, via the planetary reduction gear 7, the propellers 8, 9 which provide the majority of the thrust. The combustion gases are expelled through a nozzle 10 in order to thus increase the thrust of the turbo-engine 1. In the case of a turboprop, the flow of air forced by the propeller enters the compressor then the combustion chamber of the turbomachine. The combustion gases produced then pass into the turbine portion driving the compressor and, via a reduction gear, the shaft bearing the propeller which thus provides the main thrust, additional thrust being moreover provided by the combustion gases leaving the nozzle downstream of the turbine portion.

Furthermore, the blades 16 and 21 of the upstream and downstream propellers are of the variable-setting type, that is to say that they can rotate in their respective housings, about the geometric radial axes B of the cylindrical pivots by means of a system 23 for controlling the pitch of the blades, such that the latter assume, as recalled previously, an optimum angular position depending on the operation conditions of the turbo-engine and the flight phases in question. In the present description, only the system 23 for controlling the orientation of the blades, associated with the upstream propeller 8, will be described. The downstream propeller 9 can be equipped with a control system similar to that set out hereinbelow in connection with the upstream propeller.

It is also noted that, although the invention described herein refers to a turbo-engine having twin propellers, it may equally apply to a turboprop.

Figure 2:
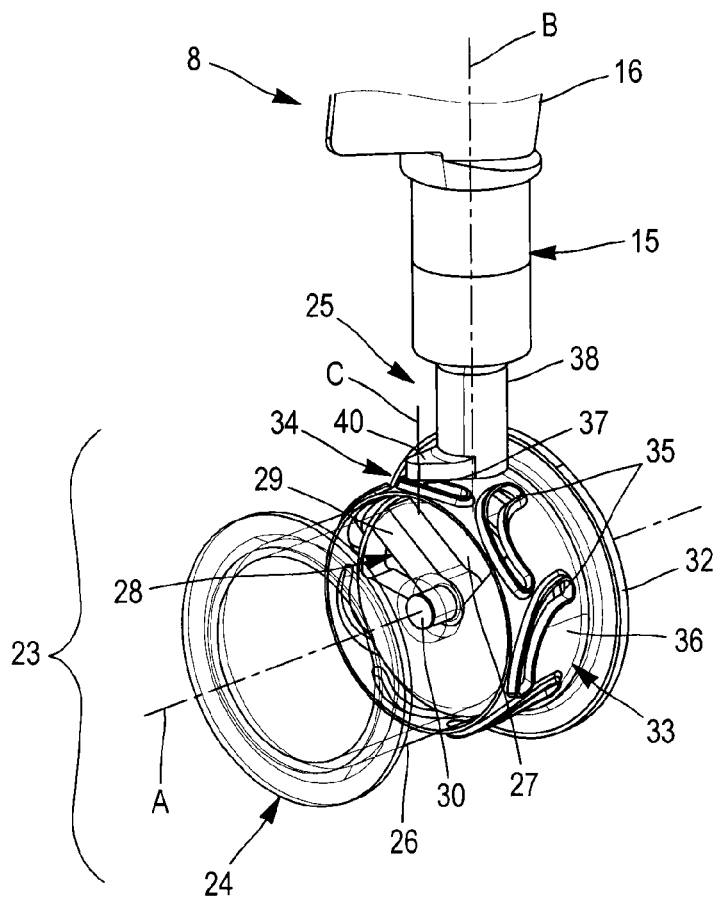
FIG. 2 is a schematic perspective view of the system for controlling the pitch of the blades of the upstream propeller, in accordance with the invention, only one of the blades to be controlled being represented.
Figure 3:
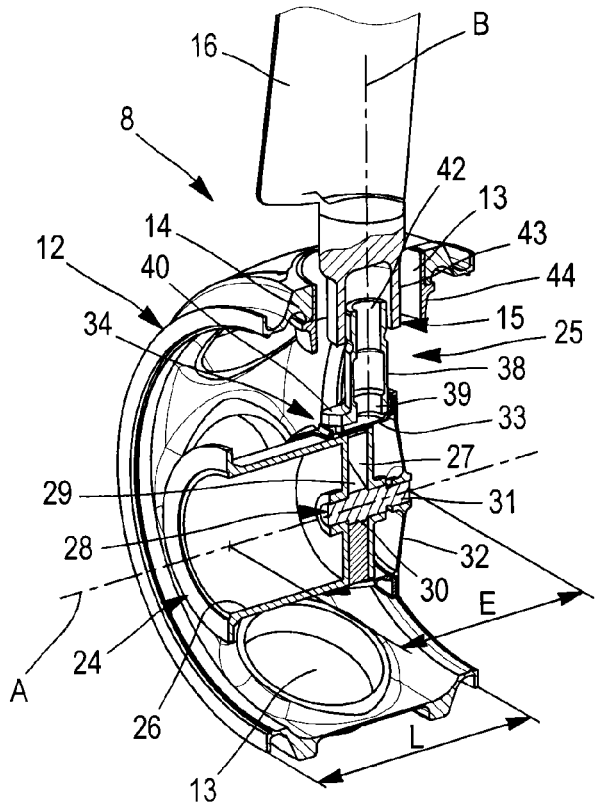
FIG. 3 is a schematic perspective view in section of said system of FIG. 2.

As FIGS. 2 and 3 show, the control system 23 comprises, principally, a controllable power actuator which, advantageously, is a rotary-action jack 24, centered with respect to the longitudinal axis A of the turbo-engine 1 and therefore of the upstream propeller 8, and a transmission device 25 connecting the jack to the blades 16 of the propeller 8.

The rotary jack 24 comprises a fixed part or cylindrical body 26 which can be mounted secured to the casing 11—rotating in this case or fixed—of the turbo-engine or on the main output shaft in the case of a turboprop, the connection of the casing or of the shaft with the jack not being illustrated here. In the fixed body 26 there is created a chamber 27 inside which is housed the rotating part 28 of the jack, specifically in this case at least one radial vane 29 mounted on a rotating shaft 30 supported, in rotating fashion, by the fixed body.

For example, the rotary power jack 24 is of the fluidic type with the chamber 27 connected to an appropriate hydraulic supply of the turbo-engine, not shown here. Thus, the radial vane 29 is subjected to the action of a hydraulic fluid driving it in rotation, with sealing, in the chamber 27 of the body 26 and thus the action of the rotating shaft 30. As a variant, the rotary power jack could be electric.

The rotating shaft 30, having a radial vane 29, of the rotary jack exits, via one of its ends 31, from the fixed body 26, outside the chamber 27. On this free end 31 there is secured, by any appropriate attachment means (screw), an annular radial flange 32 which is then connected in rotation to the shaft 30 of the jack. The flange 32 extends substantially radially, perpendicular to the axis A, and bears on its outer periphery an annular collar or ring 33. This collar 33 and the flange 32 are secured to one another by any appropriate attachment means, such that the collar is driven in rotation by the shaft 30 of the jack 24, through the flange 32. For, in particular, centering and rotational guiding purposes, the collar 33 is mounted at least in part about the fixed cylindrical body 26.

The collar 33 is part is a mobile mechanical connection 34 of the movement transmission device 25 between the jack 24 and the cylindrical pivots 15 of the blades of said control system 23. In particular, the mobile mechanical connection 34 comprises, in this exemplary embodiment, guide slots 35 of the female type, created in the sidewall 36 of the collar 33, and cams 37 of the male type, received respectively in the guide slots so as to follow the profile thereof during rotation of the collar 33. As a variant, the guide slots could be attached in a manner that is removable or not on the sidewall of the collar, respectively by bolting or by welding.

As FIGS. 2 and 4 show, the female guide slots 35 are of course identical in number with the blades to be controlled and are regularly distributed about the collar. They are all of identical arcuate, helical or another shape, according to a predetermined law relating the rotation of the collar 33 about the axis A with the rotation of the pivots 15 of the blades about their radial axes B, in the housings 13 of the hub having a ring 12 of the propeller.

As shown in FIGS. 2, 3 and 4, the male cams 37 are borne by radial arms 38 of the transmission device 25, which arms are in turn connected to the pivots 15 of the blades. The arms 38 are aligned coaxially, along the axis B, with the pivots while being secured in rotation with the latter, and thus fixed with respect to the axis A.

In particular, it can in particular be seen in FIGS. 3 and 4 that each radial arm 38 has, at its inner end 39, with respect to the axis A, a crank pin 40 perpendicular to the arm and at the end of which is mounted, about an axis C parallel to the axis B of the arm, that is to say offset parallel to the latter, the cam 37 which is spherical in shape, similar to a ball swivel. Each of the spherical cams 37, housed in the female guide slot 35, is thus in point contact with the opposite faces 41 of the latter, as will be seen below.

As concerns the outer ends 42 of the radial arms, FIG. 3, these are engaged in fixed connection with hollow cylindrical supports 43 of the pivots 15 of the blades, so as to transmit the rotation of the arms to the pivots about the axes B. This FIG. 3 shows the arrangement of the support 43 of the pivot 15 of the blade, labeled 16, in an intermediate ring 44 received in the radial housing 13 created in the sidewall 14 of the rotating hub having a ring or collar 12 of the propeller in question, bearings (not shown) being provided between the ring and the support. It is also noted that the arrangement of the radial arms 38 of the transmission device in line with the axes B of the pivots of the blades, and therefore in one and the same radial plane, helps to make the system mechanically simple and reliable, both functionally and structurally.

The compactness of the control system 23 can furthermore be appreciated since, as shown in particular in FIG. 3, its axial space requirement E, considered along the axis A and including the rotary jack 24 and the transmission device 25, does not exceed the length L of the ring 12 bearing the blades. This is in particular thanks to the rotary jack (which does away with the travel of linear jacks) and thanks to the arrangement of radial arms in line with the pivots via the guide slots and the cams of the connection 34.

Furthermore, the spherical cams 37 are surface-treated so as to have minimum friction and minimize the forces between the cams and the guide slots. To that end, it is possible to envisage surface treatments similar to those used in the raceways of ball bearings or roller bearings. A similar treatment could be provided along the guide slots.

The operation of the system 23 described hereinabove is as follows. When a change in the orientation of the setting of the blades 16 is desired, the rotary power jack 24 of the control system is powered, which drives the rotation of the vane 29 and of the shaft 30 thereof in the desired direction of rotation and by the desired angular value about the axis A. The group consisting of the radial flange 32 and the collar 33 rotates simultaneously with the arcuate guide slots 35 which, in turn, drive the motion of the cams 37.

The guide slots impart to the cams the combination of a translational motion along the axis A and a rotational motion about the axis A, that is to say a helical motion. By means of the crank pins 40, the axes C of the cams rotate, in the manner of a crank, about the arms 38 which are axially fixed with respect to the axis A, which allows the cams to follow the profile of the guide slots in their helical motion. This mobile mechanical connection 34 thus transforms the rotation of the group "vane 29—shaft 30—flange 32—collar 33" about the axis A into a concomitant rotation of the radial arms 38 and, therefore, of the blades 16 about the axes B, via the intermediary of the pivots 15 and of their supports rotating in the housings 13 of the hub having a ring 12 of the propeller 8.

It is also noted that, when the collar rotates, as shown in FIGS. 4 and 5, the flanks or inner faces 41 of the arcuate guide slots 35 are inclined with respect to one another, which has no influence on the motion of the spherical cams or ball swivels by virtue of the point contacts P between the latter and the inner flanks of the guide slots. Moreover, as already indicated, the male cams 37 remain in contact with the guide slots 35 although the radial position of the latter varies depending on the angular position of the collar 33, by virtue of the fact that these cams rotate by means of the crank pins 40 with reference to their eccentric vertical axes C about the axes B, describing a circular trajectory.

As a variant, as shown in FIG. 6, a cylindrical annular sleeve 45 is mounted about each spherical cam 37, such that the contact between the sleeve 45 and the inner flanks 41 of the arcuate guide slot is linear and occurs along two diametrically opposed generatrices G. Each sleeve 45 can thus roll in the associated guide slot 35 instead of sliding in the embodiment featuring a spherical cam, the cylindrical sleeve remaining in contact with the flanks of the female guide slot via the intermediary of the spherical cam. The "sleeve-ball swivel" group can move with reference to the vertical axis C in order to remain sufficiently in contact in the female guide slot.

The invention claimed is:

1. A system for controlling the pitch of blades of a propeller of a turbomachine, comprising;
   a propeller;
   a power actuator coaxial with an axis of rotation of the propeller; and
   a transmission device connecting the power actuator to pivots of the blades to be controlled, arranged substantially radially with respect to said axis of rotation of the propeller, said power actuator comprising a fixed body, said fixed body comprising a chamber connected to a hydraulic supply, the chamber receiving a radial vane of a rotating mobile part, wherein hydraulic pressure from the hydraulic supply causes rotation of the radial vane about said axis of rotation of the propeller,
   wherein the rotating mobile part of the power actuator is secured in rotation with a substantially cylindrical collar which extends at least in part about said body of the power actuator and which comprises guide slots which engage with cams of the transmission device in order to transform the rotation of the radial vane of the rotating mobile part of the power actuator about said axis of rotation of the propeller into a rotation of the blades about axes of the pivots which are perpendicular to the axis of rotation of the propeller.

2. The system as claimed in claim 1, wherein the propeller comprises an annular hub housing the pivots of the blades, the hub extending at least in part about said collar.

3. The system as claimed in claim 1, wherein said guide slots are female guide slots and said cams are male cams received in the guide slots.

4. The system as claimed in claim 3, wherein the female guide slots are arcuate or helical, and are created in or attached to the collar, in a permanent or removable manner, and the male cams are borne by respective radial arms of the transmission device in connection with the pivots of the blades.

5. The system as claimed in claim 4, wherein the cams are eccentric to the radial arms and are parallel to the radial arms in order to rotate about the axes of the latter as a consequence of the rotation of the collar having guide slots, the connection between each cam and the associated guide slot being spherical or cylindrical.

6. The system as claimed in claim 3, wherein the radial arms of the transmission device are arranged in line with the pivots of the blades, being connected coaxially therewith.

7. The system as claimed in claim 4, wherein the collar having guide slots is secured to an output shaft of the rotating mobile part of the power actuator by a radial coupling flange attached to the shaft on an inside and to the collar on an outside.

8. A turbomachine of the type comprising at least one propeller and a system for controlling the pitch of blades of the at least one propeller,
   wherein the system for controlling the pitch of the blades of the propeller is as defined in claim 1.

* * * * *